J. Fox,
Lining Petroleum Barrels.
N° 47,810.  Patented May 23, 1865.
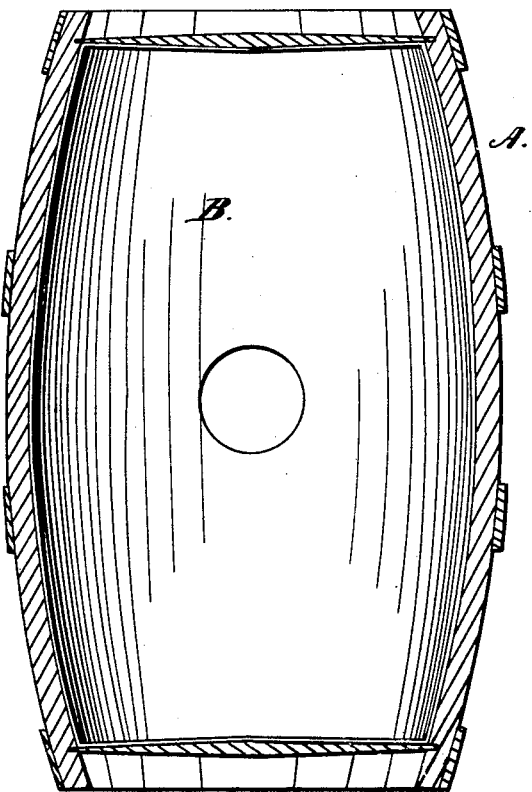
Witnesses  
Wm Crewn  
Thos Tused
Inventor:  
Jno Fox  
By Munn & Co  
Attys

UNITED STATES PATENT OFFICE.

JOHN FOX, OF PHILADELPHIA, PENNSYLVANIA.

IMPROVED COMPOSITION FOR LINING PETROLEUM-BARRELS.

Specification forming part of Letters Patent No. 47,810, dated May 23, 1865.

*To all whom it may concern:*

Be it known that I, JOHN FOX, of Philadelphia, in the county of Philadelphia and State of Pennsylvania, have invented a new and useful Improvement in Lining Barrels and other Vessels; and I do hereby declare that the following is a full, clear, and exact description thereof, which will enable those skilled in the art to make and use the same, reference being had to the accompanying drawings, forming part of this specification.

The drawing, consisting of only one figure, represents a vertical section of a barrel to which my invention has been applied.

This invention is designed to make wooden vessels impermeable to liquids; and it consists in applying to its interior surface a composition which will fill its cracks and joints, and fill and cover the pores of the wood of which the vessel is made, so that liquids of a highly penetrative character—such as petroleum—cannot pass through the vessel.

Heretofore wooden barrels and tanks and other vessels which are meant to contain petroleum and other liquids of a penetrating character have been made of the best material, and consequently at considerable cost, with a view to prevent leakage from the passage of such liquids through their joints and pores, and yet such leakage has not thereby been prevented.

The object of my invention is to prepare such vessels in such a manner as that they will hold petroleum and other liquids, and this I accomplish by means of a cement composed as follows: To four parts of potash mixed with water, to form a thick paste, I add one part of sulphur, one part of chloride of sodium, (common salt,) and two parts of pulverized hydraulic cement. These are then well mixed together, adding to the mass water sufficient.

Instead of potash I can substitute the same amount of pearlash or caustic soda or carbonate of soda. I then boil the mass for about one-half an hour, when it is ready to be applied to the vessels which are to be sealed. I apply it while hot in the following manner: A sufficient quantity thereof is poured into the vessel to be treated, say about —— gallons to a barrel of thirty-two gallons, which is then closed tightly, so as to confine the composition therein, and the vessel is then moved and rolled and turned over and over, so as to bring the composition in contact with the whole interior surface. The expansion of the air, which takes place within the vessel by reason of its being heated by the hot composition, produces a great pressure, which operates to force the composition into the joints and crevices and pores of the vessel and against its surface. After the vessel has been so treated for about the space of about one-half an hour, more or less, it is opened and that portion of the composition which has not adhered to the vessel—that is, the surplus portion—may be run off to be used again. The vessel is then allowed to stand for two or three days to give the composition which lines it time to set and harden, when it is ready for use.

The use of this composition enables me to use stuff of a quality which would be rejected in making vessels to be used without such a protection, because it covers defective places.

I claim as new and desire to secure by Letters Patent—

The composition, made substantially as above described, for sealing barrels and other vessels, as set forth.

JOHN FOX.

Witnesses:
WILLIAM SHAW,
LORENZ HEYER.